(12) United States Patent
Kajouke et al.

(10) Patent No.: US 7,768,228 B2
(45) Date of Patent: Aug. 3, 2010

(54) METHOD AND SYSTEM FOR CONVERTING DC POWER TO AC POWER

(75) Inventors: Lateef A. Kajouke, San Pedro, CA (US); Brian A Welchko, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 347 days.

(21) Appl. No.: 11/853,894

(22) Filed: Sep. 12, 2007

(65) Prior Publication Data
US 2009/0066271 A1   Mar. 12, 2009

(51) Int. Cl.
*H02P 27/04* (2006.01)
(52) U.S. Cl. .......................................... 318/811; 363/71
(58) Field of Classification Search ................. 318/800, 318/801, 811, 814; 363/71, 98
See application file for complete search history.

(56) References Cited

U.S. PATENT DOCUMENTS

| 5,103,711 | A  | * | 4/1992  | Iwase ........................... 84/660 |
| 5,142,468 | A  | * | 8/1992  | Nerem ......................... 363/71 |
| 7,116,012 | B2 | * | 10/2006 | Kajouke et al. ............... 307/64 |
| 2003/0231518 | A1 | * | 12/2003 | Peng ............................ 363/98 |
| 2004/0228150 | A1 | * | 11/2004 | Sato ............................ 363/23 |
| 2007/0145941 | A1 | * | 6/2007  | Asada et al. ................. 318/811 |

* cited by examiner

*Primary Examiner*—Rina I Duda
(74) *Attorney, Agent, or Firm*—Ingrassia Fisher & Lorenz, P.C.

(57) ABSTRACT

Methods and systems for converting direct current (DC) power to alternating current (AC) power are provided. A first phase of the AC power is generated based on a first carrier signal. A second phase of the AC power is generated based on a second carrier signal.

20 Claims, 4 Drawing Sheets

METHOD AND SYSTEM FOR CONVERTING DC POWER TO AC POWER

TECHNICAL FIELD

The present invention generally relates to power inverters, and more particularly relates to methods and systems for converting DC power to AC power.

BACKGROUND OF THE INVENTION

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Many of the electrical components, including the electric motors, used in such vehicles receive electrical power from alternating current (AC) power supplies. However, the power sources (i.e., batteries) used in such applications provide only direct current (DC) power. Thus, devices known as power inverters are used to convert the DC power to AC power, which often utilize several of switches, or transistors, operated at various intervals to convert the DC power to AC power.

In recent years, "z-source" inverters have been developed which have several advantages over conventional power inverters. For example, due to the impedance source (e.g., including one or more inductors) included therein, z-source inverters have the ability to produce an output voltage that is greater than or less than the voltage of the DC power provided. However, conventional methods, such as Pulse Width Modulation (PWM), used to control the switches within the inverters cause a ripple current to pass through the inductors with a relatively low frequency. As a result, very large and expensive inductors must be used in such power inverters, as the required size of the inductors is proportional to the frequency of the ripple current.

Accordingly, it is desirable to provide a method and system for converting DC power to AC power that allows for the use of smaller and less expensive inductors. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method for converting direct current (DC) power to alternating current (AC) power is provided. A first phase of the AC power is generated based on a first carrier signal. A second phase of the AC power is generated based on a second carrier signal.

In another embodiment, a method for operating a multi-phase motor through a power inverter having a pair of switches for each phase of the motor is provided. A first carrier signal is generated, and a first modulation signal is generated. The first carrier signal and the first modulation signal jointly determine a first waveform. A first pair of the switches in the power inverter is operated based on the first waveform. A second carrier signal is generated, and a second modulation signal is generated. The second carrier signal and the first modulation signal jointly determine a second waveform. A second pair of the switches in the power inverter is operated based on the second waveform.

In a further embodiment, an automotive drive system is provided. The automotive drive system includes a direct current (DC) power supply, an electric motor, a power inverter, and a processor. The DC power supply is coupled to the electric motor. The power inverter includes first and second pairs of switches and is coupled to the electric motor and the DC power supply to receive DC power from the DC power supply and provide alternating current (AC) power to the electric motor. The processor is in operable communication with the electric motor, the DC power supply, and the power inverter. The processor is configured to generate a first carrier signal, operate the first pair of switches in the power inverter based on the first carrier signal, generate a second carrier signal, and operate the second pair of switches in the power inverter based on the second carrier signal.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-7 are merely illustrative and may not be drawn to scale.

FIG. 1 to FIG. 7 illustrate a method and system for converting direct current (DC) power to (AC) power. A first phase of the AC power is generated based on a first carrier signal. A second phase of the AC power is generated based on a second carrier signal. In one embodiment, the generating of the first phase comprises operating a first set of switches in a power inverter based on the first carrier signal, and the generating of the second phase comprises operating a second set of switches in the power inverter based on the second carrier signal.

Figure 1:
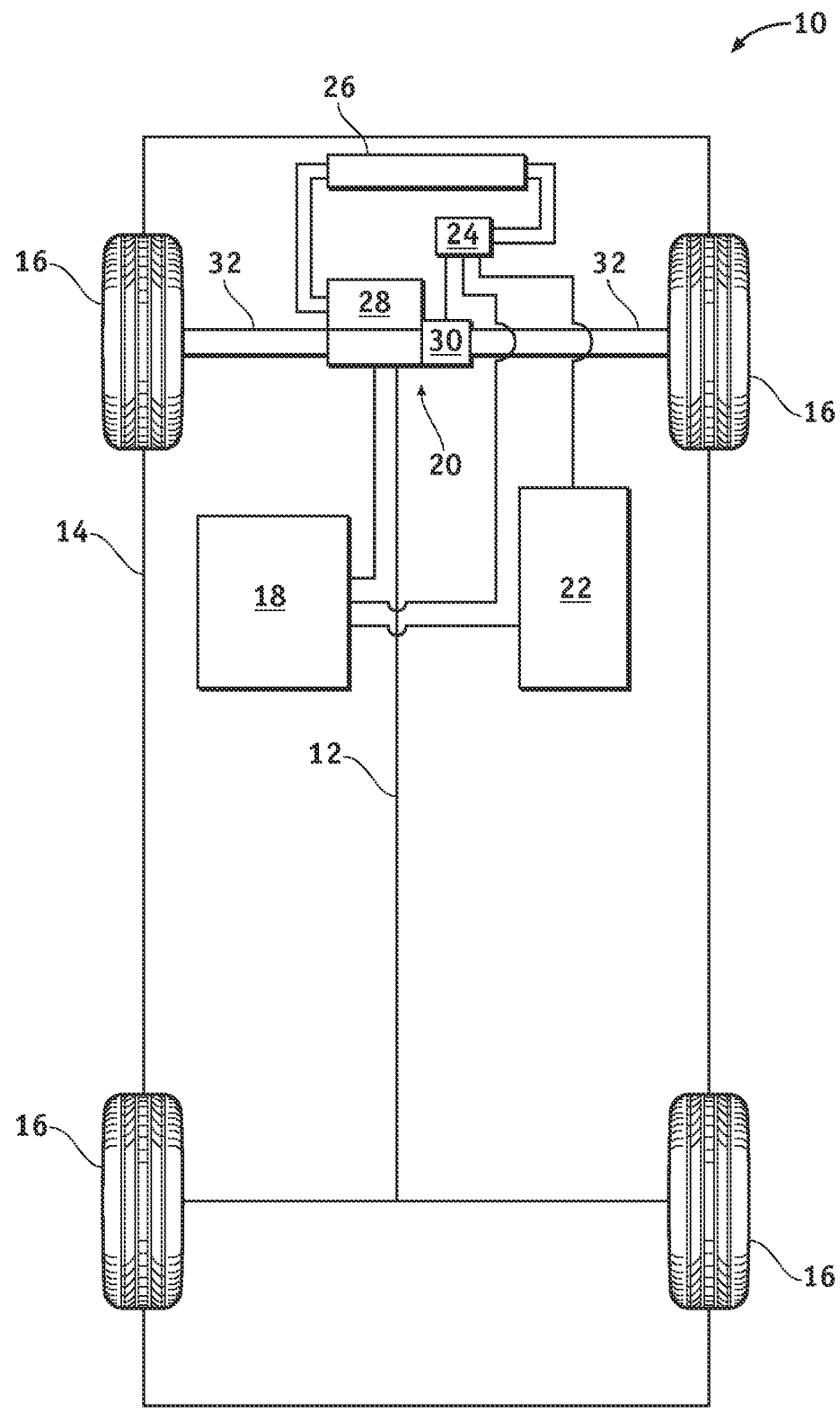
FIG. 1 is a schematic view of an exemplary automobile according to one embodiment of the present invention.

FIG. 1 illustrates a vehicle 10, or "automobile," according to one embodiment of the present invention. The automobile 10 includes a chassis 12, a body 14, four wheels 16, and an electronic control system (or electronic control unit (ECU)) 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 10 is a hybrid vehicle, and further includes an actuator assembly (or powertrain) 20, a battery 22, a power inverter (or inverter) 24, and a radiator 26. The actuator assembly 20 includes an internal combustion engine 28 and an electric motor/generator (or motor) system (or assembly) 30. The electric motor system 30, in one embodiment, includes one or more sinusoidally-wound, three-phase alternating current (AC) motor/generators (or motors) (e.g., permanent magnet or induction) such as commonly used in automotive vehicles (e.g., traction drive control systems, and the like). As will be appreciated by one skilled in the art, each of the electric motors includes a stator assembly (including conductive coils), a rotor assembly (including a ferromagnetic core), and a cooling fluid (i.e., coolant). The stator assembly and/or the rotor assembly within the electric motors may include multiple (e.g., sixteen) electromagnetic poles, as is commonly understood.

Still referring to FIG. 1, and as described in greater detail below, the combustion engine 28 and the electric motor system 30 are integrated such that both are mechanically coupled to at least some of the wheels 16 through one or more drive shafts 32. The radiator 26 is connected to the frame at an outer portion thereof and although not illustrated in detail, includes multiple cooling channels therethrough that contain a cooling fluid (i.e., coolant) such as water and/or ethylene glycol (i.e., "antifreeze") and is coupled to the engine 28 and the inverter 24. Referring again to FIG. 1, in the depicted embodiment, the inverter 24 receives and shares coolant with the electric motor 30. The radiator 26 may be similarly connected to the inverter 24 and/or the electric motor 30.

The electronic control system 18 is in operable communication with the actuator assembly 20, the battery 22, and the inverter 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
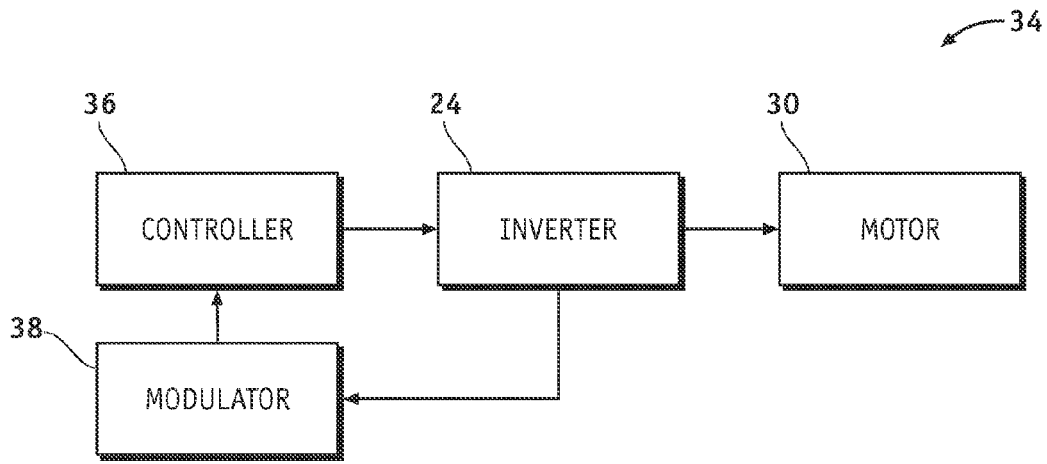
FIG. 2 is a block diagram of an inverter system within the automobile of FIG. 1.

Referring to FIG. 2, a voltage source inverter system (or electric drive system) 34 is shown in accordance with an exemplary embodiment of the present invention. The voltage source inverter system 34 includes a controller 36, the inverter 24 coupled to an output of the controller 36, the motor 30 coupled to a first output of the inverter 24, and a modulator 38 having an input coupled to a second output of the inverter 24 and having an output coupled to an input of the controller 36. The controller 36 and the modulator 38 may be integral with the electronic control system 18 shown in FIG. 1.

Figure 3:
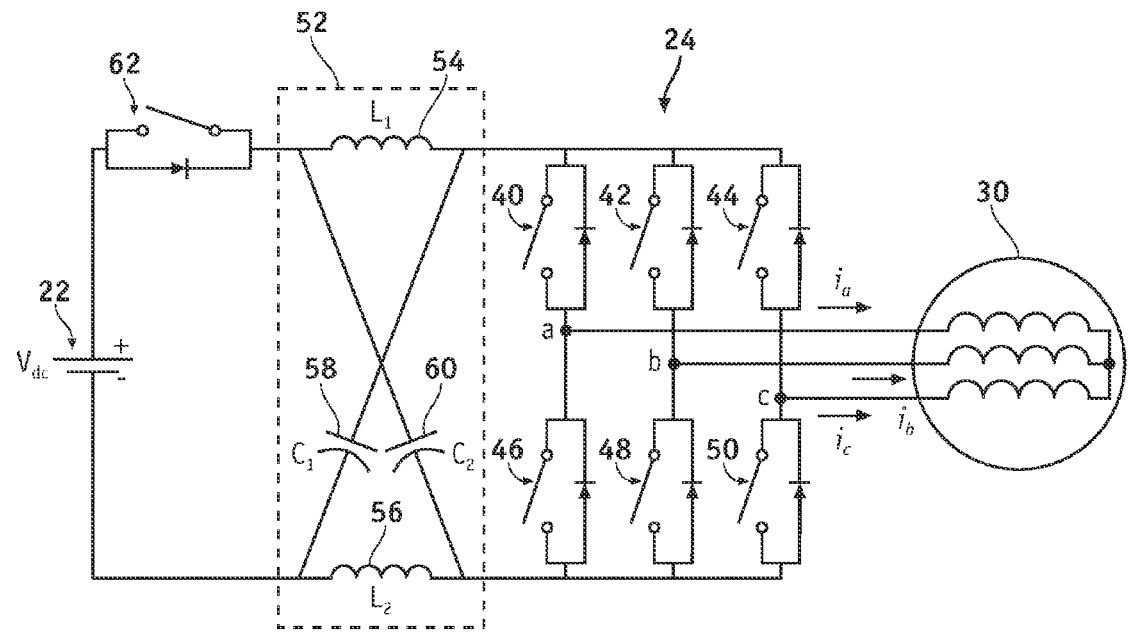
FIG. 3 is a schematic view of a power inverter within the automobile of FIG. 1.

FIG. 3 illustrates the inverter 24 of FIGS. 1 and 2 in greater detail. The inverter 24 includes a three-phase circuit coupled to the motor 30. More specifically, the inverter 24 includes a switch network having a first input coupled to a voltage source $V_{dc}$ (e.g., the battery 22) and an output coupled to the motor 30. Although a single voltage source is shown, a distributed direct current (DC) link with two series sources may be used.

The switch network comprises three pairs (a, b, and c) of series switches with antiparallel diodes (i.e., antiparallel to each switch) corresponding to each of the phases. Each of the pairs of series switches comprises a first switch, or transistor, (i.e., a "high" switch) 40, 42, and 44 having a first terminal coupled to a positive electrode of the voltage source 22 and a second switch (i.e., a "low" switch) 46, 48, and 50 having a second terminal coupled to a negative electrode of the voltage source 22 and having a first terminal coupled to a second terminal of the respective first switch 40, 42, and 44.

In one embodiment, the inverter 24 is a "z-source" inverter, as is commonly understood, and includes an impedance source 52 coupled between the battery 22 and the first, second, and third pairs of switches, which includes an inductive component (or at least one inductor) and a capacitive component (or at least one capacitor). In the depicted embodiment, the inductive component includes a split inductor having a first inductive portion 54 and a second inductive portion 56, each of which has first and second sides. The first inductive portion 54 is connected between the first switches 40, 42, and 44 and the positive electrode of the battery 22. The second inductive portion 56 is connected between the second switches 46, 48, and 50 and the negative terminal of the battery 22.

The capacitive component includes a first capacitor 58 and a second capacitor 60 connected in an "X" configuration to the first and second inductive portions 54 and 56. That is, the first capacitor 58 has a first terminal connected to the first side of the first inductive portion 54 and a second terminal connected to the second side of the second inductive portion 56. The second capacitor 60 has a first terminal connected to the second side of the first inductive portion 54 and a second terminal connected to the first side of the second inductive portion 56. In the depicted embodiment, the inverter 24 also includes an additional switch 62, which may be similar to the switches 40-50, and is used to allow a higher voltage to be maintained on inverter side of the DC bus.

In accordance with aspects of this particular invention, during operation, still referring to FIG. 1, the vehicle 10 is operated by providing power to the wheels 16 with the combustion engine 28 and the electric motor assembly 30 in an alternating manner and/or with the combustion engine 28 and the electric motor assembly 30 simultaneously. In order to power the electric motor assembly 30, DC power is provided from the battery 22 to the inverter 24, which converts the DC power into AC power, before the power is sent to the electric motor 30. As will be appreciated by one skilled in the art, the conversion of DC power to AC power is substantially performed by operating (i.e., repeatedly switching) the switches 40-50 within the inverter 24 at a "switching frequency," such as, for example, 12 kilohertz (kHz).

Referring again to FIG. 2, generally, the controller 36 produces Pulse Width Modulation (PWM) signals for controlling the switching action of the inverter 24. In a preferred embodiment, the controller 36 preferably produces continuous PWM (CPWM) signals where each upper and lower switch conducts for a portion of each switching cycle of the inverter 24. The inverter 24 then converts the PWM signals to a modulated voltage waveform for operating the motor 30.

Figure 4:
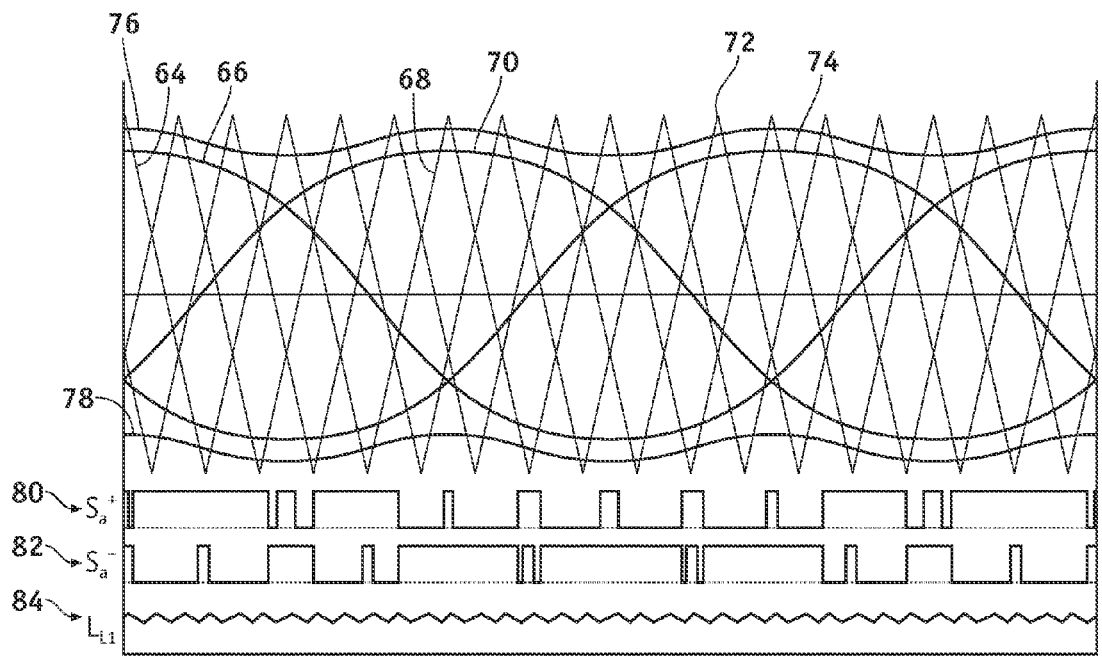
FIG. 4 is a graphical illustration of first, second, and third sets of carrier and modulation signals, along with shoot-through modulation signals and associated waveforms, generated by the inverter system of FIG. 2 to control the power inverter of FIG. 3.

FIG. 4 graphically illustrates the PWM signals generated by the controller 36 (and/or the modulator 38) for operation of the switches 40-50, in accordance with one embodiment of the present invention. As shown, three separate carrier signals and three separate modulation signals are generated, each for a respective pair of the switches (a, b, and c) shown in FIG. 3. In particular, the controller 36 (and/or modulator 38) generates a first carrier signal 64, a first modulation signal 66, a second carrier signal 68, a second modulation signal 70, a third carrier signal 72, and a third modulation signal 74. In one embodiment, the controller 36 also generates a high shoot-through modulation signal 76 and a low shoot-through modulation signal 78.

As will be described in greater detail below, each set of a carrier signal and a modulation signal, along with the shoot-through modulation signals 76 and 78, may be combined to generate a "high" waveform 80 and a "low" waveform 82. It should be noted that the waveforms 80 and 82 shown in FIG. 4 correspond to the first carrier signal 64 and the first modulation signal 66. As will be appreciated by one skilled in the art, the three separate sets of carrier signals and modulations signals increases the frequency of the ripple current flowing through the inductive component within the inverter 24, as indicated by the ripple current 84 also represented in FIG. 4.

Figure 5:
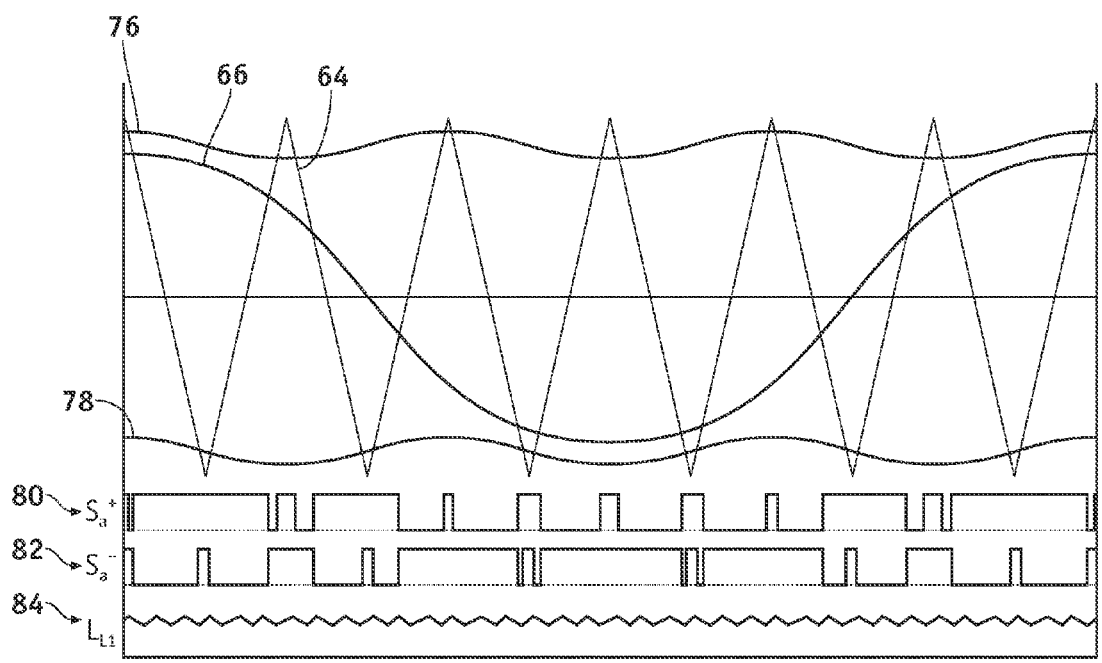
FIG. 5 is a graphical illustration of the first set of carrier and modulation signals and the associated waveforms of FIG. 4.
Figure 6:
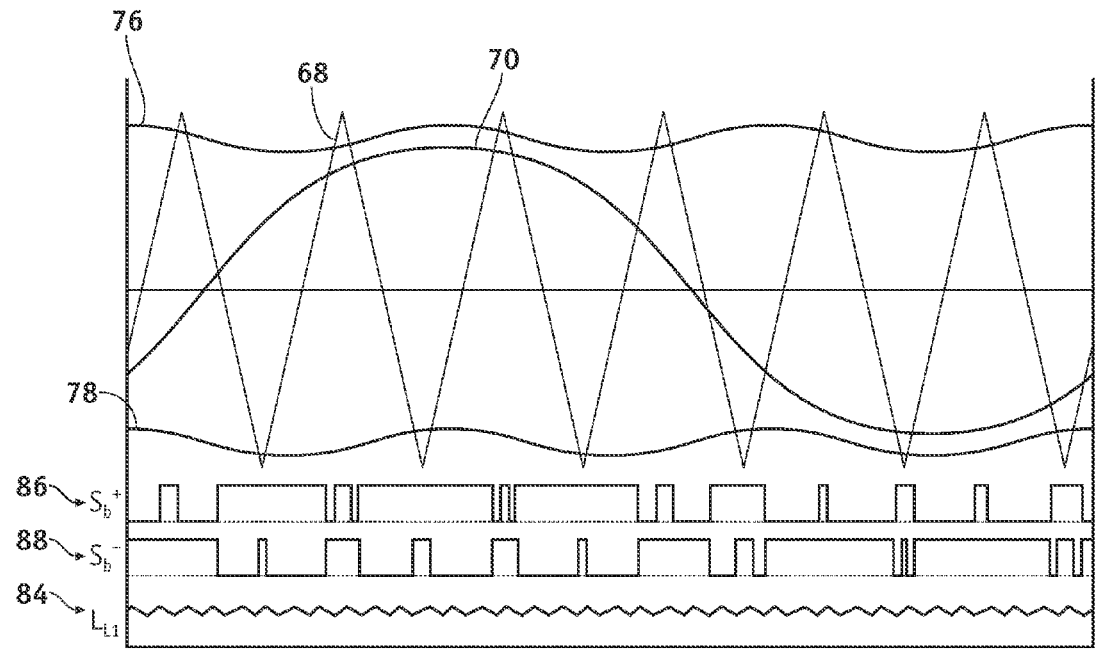
FIG. 6 is a graphical illustration of the second set of carrier and modulation signals of FIG. 4, along with associated waveforms.
Figure 7:
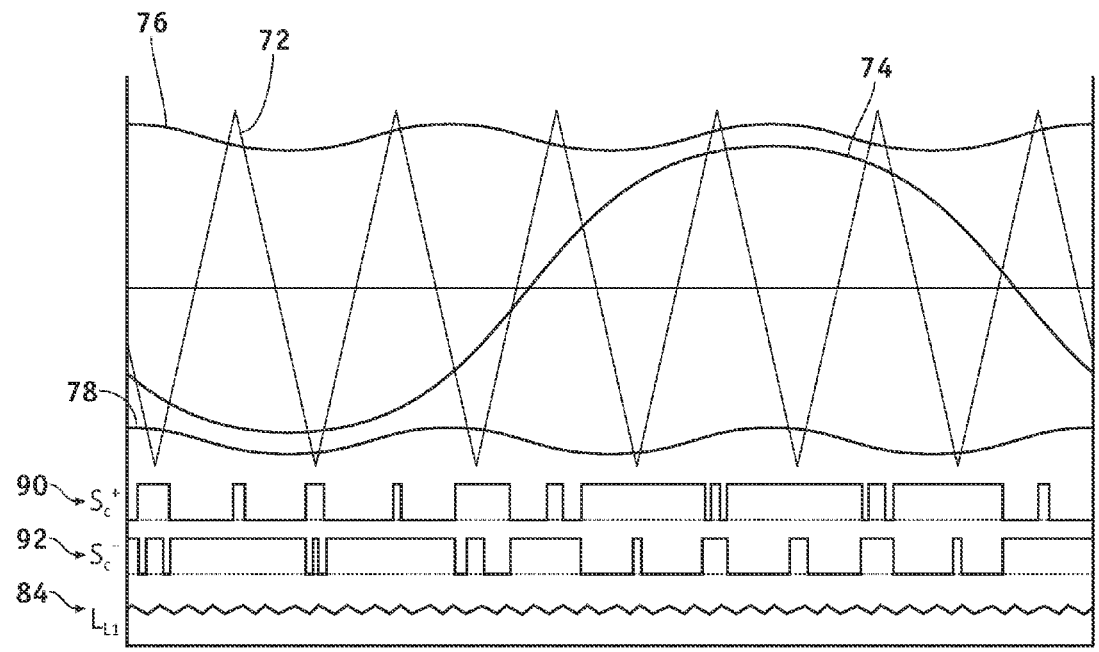
FIG. 7 is a graphical illustration of the third set of carrier and modulation signals of FIG. 4, along with associated waveforms.

For sake of clarity, each of FIGS. 5, 6, and 7 graphically illustrate only one set of the carrier and modulation signals in addition to the shoot-through modulation signals 76 and 78, along with the associated waveforms. FIG. 5 shows the first carrier signal 64 and the first modulation signal 66. As is apparent in FIG. 5, the high waveform 80 is in a "high" or "on" state when the first modulation signal 66 has an amplitude that is greater than the first carrier signal 64 and/or whenever the first carrier signal 64 passes beyond the shoot-through carrier signals 76 and 78. The high waveform 80 shown in FIG. 5 is used to control the first, or high, switch 40 in the first pair (a) of switches in the inverter 24. The low waveform 82 is in a high or on state when the first modulation signal 66 has an amplitude that is less than the first carrier signal 64 and/or whenever the first carrier signal 64 passes beyond the shoot-through carrier signals 76 and 78. The low waveform 82 shown in FIG. 5 is used to control the second, or low, switch 46 in the first pair (a) of switches in the inverter 24.

FIG. 6 shows the second carrier signal 68 and the second modulation signal 70. In a manner similar to that described above, a high waveform 86 and a low waveform 88 are formed from the second carrier signal 68 and the second modulation signal 70, along with the shoot-through carrier signals 76 and 78. The high waveform 86 shown in FIG. 6 is used to control the first switch 42 in the second pair (b) of switches in the inverter 24, and the low waveform 88 shown in FIG. 6 is used to control the second switch 48 in the second pair (b) of switches in the inverter 24.

FIG. 7 shows the third carrier signal 72 and the third modulation signal 74. In a manner similar to that described above, a high waveform 90 and a low waveform 92 are formed from the third carrier signal 72 and the third modulation signal 74, along with the shoot-through carrier signals 76 and 78. The high waveform 90 shown in FIG. 7 is used to control the first switch 44 in the third pair (c) of switches in the inverter 24, and the low waveform 92 shown in FIG. 7 is used to control the second switch 50 in the third pair (c) of switches in the inverter 24.

As is commonly understood, the waveforms 80, 82, 86, 88, 90, and 92, as well as the corresponding operation of the switches, determine the output voltages of the different legs of the inverter 24, and thus the voltages applied across the windings within the motor 30. As such, the operation of the each of the pairs of switches (a, b, and c) generates a respective phase of the AC power sent to the motor 30.

One advantage of the method and system described above is that because of the separate and interleaved carrier signals that are used to operate each pair of switches (or each phase of the motor), the ripple current frequency in the inductive component in the inverter is increased. In one embodiment utilizing a three-phase motor, the frequency of the ripple current is tripled (e.g., to 72 kHz) compared to using a single carrier signal for all three phases (24 kHz or twice the carrier frequency of 12 kHz). Therefore, the size of the inductive component within the inverter may be reduced (e.g., to ⅓ of its size when a single carrier signal is used).

Other embodiments may utilize the method and system described above in implementations other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an electric motor comprising a first winding and a second winding, the method comprising:
    generating a first phase of alternating current (AC) power based on a first carrier signal, wherein the generating of the first phase of AC power comprises operating a first set of switches in a power inverter based on the first carrier signal, and said operating of the first set of switches causes current to flow through the first winding within the electric motor; and
    generating a second phase of the AC power based on a second carrier signal, wherein the generating of the second phase of AC power comprises operating a second set of switches in the power inverter based on the second carrier signal, and said operating of the second set of switches causes current to flow through the second winding within the electric motor.

2. The method of claim 1, wherein the first set of switches is connected in series by a first node and the second set of switches is connected in series by a second node, the first winding of the electric motor is connected to the first node, and the second winding of the electric motor is connected to the second node.

3. The method of claim 2, further comprising:
generating the first and second carrier signals;
generating a first modulation signal, and wherein the operation of the first set of switches is further based on the first modulation signal; and
generating a second modulation signal, and wherein the operation of the second set of switches is further based on the second modulation signal.

4. The method of claim 3, wherein the first carrier signal and the first modulation signal jointly determine a first waveform, and wherein the operation of the first set of switches is further based on the first waveform.

5. The method of claim 4, wherein the second carrier signal and the second modulation signal jointly determine a second waveform, and wherein the operation of the second set of switches is further based on the second waveform.

6. The method of claim 2, further comprising:
generating a third carrier signal; and
generating a third phase of the AC power based on the third carrier signal.

7. The method of claim 6, wherein the generating of the third phase comprises operating a third set of switches in the power inverter based on the third carrier signal, and said operating of the second set of switches causes current to flow through a second winding within the electric motor.

8. The method of claim 7, further comprising generating a third modulation signal, the third carrier signal and the third modulation signal jointly determining a third waveform, and wherein the operation of the third set of switches is further based on the third waveform.

9. A method for operating a multi-phase motor through a power inverter having a pair of switches for each phase of the motor, the method comprising:
generating a first carrier signal;
generating a first modulation signal, the first carrier signal and the first modulation signal jointly determining a first waveform;
operating a first pair of the switches in the power inverter based on the first waveform, wherein the first pair of switches is connected to a first winding in the motor such that the operating of the first pair of switches causes current to flow through the first winding;
generating a second carrier signal;
generating a second modulation signal, the second carrier signal and the first modulation signal jointly determining a second waveform; and
operating a second pair of the switches in the power inverter based on the second waveform, wherein the second pair of switches is connected to a second winding in the motor such that the operating of the second pair of switches causes current to flow through the second winding.

10. The method of claim 9, further comprising:
generating a third carrier signal;
generating a third modulation signal, the third carrier signal and the third modulation signal jointly determining a third waveform; and
operating a third pair of the switches in the power inverter based on the third waveform, wherein the third pair of switches is connected to a third winding in the motor such that the operating of the third pair of switches causes current to flow through the third winding.

11. An automotive drive system comprising:
an electric motor comprising a first winding and a second winding;
a direct current (DC) power supply coupled to the electric motor;
a power inverter comprising first and second pairs of switches and being coupled to the electric motor and the DC power supply to receive DC power from the DC power supply and provide alternating current (AC) power to the electric motor, wherein the first pair of switches is connected in series by a first node and the second pair of switches is connected in series by a second node, and further wherein the first winding of the electric motor is connected to the first node, and the second winding of the electric motor is connected to the second node; and
a processor in operable communication with the electric motor, the DC power supply, and the power inverter, the processor being configured to:
generate a first carrier signal;
operate the first pair of switches in the power inverter based on the first carrier signal;
generate a second carrier signal; and
operate the second pair of switches in the power inverter based on the second carrier signal.

12. The automotive drive system of claim 11, wherein the processor is further configured to:
generate a first modulation signal, the first carrier signal and the first modulation signal jointly determining a first waveform and the operation of the first pair of switches being further based on the first waveform; and
generate a second modulation signal, the second carrier signal and the second modulation signal jointly determining a second waveform and the operation of the second pair of switches being further based on the second waveform.

13. The automotive drive system of claim 12, wherein the DC power supply comprises a battery, a fuel cell, or a combination thereof.

14. The automotive drive system of claim 13, wherein the electric motor comprises a third winding, and wherein the power inverter further comprises a third pair of switches connected in series by a third node, and the third winding of the electric motor is connected to the third node.

15. The automotive drive system of claim 14, wherein the processor is further configured to:
generate a third carrier signal; and
operate the third pair of switches based on the third carrier signal.

16. The automotive drive system of claim 15, wherein the processor is further configured to generate a third modulation signal, the third carrier signal and the third modulation signal jointly determining a third waveform and the operation of the third pair of switches being further based on the third waveform.

17. The automotive drive system of claim 16, wherein the power inverter further comprises an impedance source coupled between the DC power source and the first, second, and third pairs of switches.

18. The automotive drive system of claim 17, wherein the impedance source comprises at least one inductor and at least one capacitor.

19. The automotive drive system of claim 18, wherein the at least one inductor comprises a split inductor having first and second inductive portions with first and second sides and the at least one capacitor comprises first and second capacitors, the first capacitor having a first terminal connected to the first side of the first inductive portion and a second terminal connected to the second side of the second inductive portion and the second capacitor having a first terminal connected to the second side of the first inductive portion and a second terminal connected to the first side of the second inductive portion.

20. The automotive drive system of claim 19, wherein the first, second, and third pairs of switches comprise a plurality of transistors.

* * * * *